US007407179B2

(12) United States Patent
Tsuruta et al.

(10) Patent No.: US 7,407,179 B2
(45) Date of Patent: Aug. 5, 2008

(54) SADDLE-RIDE TYPE VEHICLE

(75) Inventors: Yuichiro Tsuruta, Wako (JP); Toru Iwadate, Wako (JP); Taeko Togawa, Wako (JP); Yoshiaki Noda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 11/388,546

(22) Filed: Mar. 24, 2006

(65) Prior Publication Data

US 2006/0219209 A1   Oct. 5, 2006

(30) Foreign Application Priority Data

Mar. 31, 2005  (JP) .............................. 2005-102500

(51) Int. Cl.
*B60K 13/06* (2006.01)
*F02M 35/04* (2006.01)
(52) U.S. Cl. .................... 280/727; 180/68.3; 123/198 E
(58) Field of Classification Search ................. 180/311, 180/312, 908, 68.1, 68.3; 280/727; 123/198 E
See application file for complete search history.

(56) References Cited

U.S. PATENT DOCUMENTS 4,331,358 A * 5/1982 Johnson et al. ............ 296/78.1
5,172,788 A * 12/1992 Fujii et al. ................. 180/219
6,422,201 B1 * 7/2002 Yamada et al. ............. 123/336
2004/0060545 A1* 4/2004 Kurayoshi et al. .......... 123/472
2004/0173394 A1* 9/2004 Tsuruta et al. ............. 180/68.1

FOREIGN PATENT DOCUMENTS

| JP | 2-28077    | * | 1/1990 | ................ 180/68.3 |
| JP | 2-38194    | * | 2/1990 | ................ 180/68.3 |
| JP | 3-125684   | * | 5/1991 | ................ 180/311  |
| JP | 4-31189    | * | 2/1992 | ................ 180/68.3 |
| JP | 2004-183574 |  | 7/2004 |                          |

* cited by examiner

*Primary Examiner*—Christopher Ellis
*Assistant Examiner*—Joseph Rocca
(74) *Attorney, Agent, or Firm*—Hamre, Schumann, Mueller & Larson, P.C.

(57) ABSTRACT

A saddle-ride type vehicle eliminates the input of disturbances to a throttle body upon opening/closing of a vehicle seat, and is capable of reliably protecting an injector. An air cleaner 18 is disposed on the rear side of an engine 5, a fuel tank 22 is disposed above the engine 5, and a seat 23 is disposed on the rear side of the fuel tank 22 such that the seat 23 can be opened or closed. A throttle body 17 having an injector 17a is disposed in a space below the seat 23 and between the engine 5 and the air cleaner 18. A protector cover 80 covers the throttle body 17 from the upper side.

9 Claims, 4 Drawing Sheets

SADDLE-RIDE TYPE VEHICLE

FIELD OF THE INVENTION

The present technical disclosure relates to a saddle-ride type vehicle such as an ATV (All Terrain Vehicle), and more particularly to a saddle-ride type vehicle in which a fuel tank is disposed above an engine attached to a body frame and a seat on which a rider is seated is disposed on the rear side of the fuel tank such that the seat is openable/closable.

BACKGROUND OF THE INVENTION

A typical structure of a saddle-ride type vehicle such as an ATV is such that an engine is mounted at a substantially central portion of a body frame, a fuel tank is disposed above the engine, and a seat on which a rider is seated is disposed on the rear side of the fuel tank such that the seat is openable/closable. In most vehicles of this type, an air cleaner of an air inlet circuit of the engine is disposed below the seat, so that the outside air that has passed through the air cleaner is taken into the engine through a throttle body. A carburetor as a fuel introducing portion is disposed in the throttle body, so that a fuel supplied from a fuel pump is atomized and introduced into the engine along with the air taken in from the exterior, such as disclosed, for example, in Japanese Patent No. JP-A No. 183574/2004.

In the conventional saddle-ride type vehicle, the throttle body having the fuel introducing portion and the air cleaner are disposed below the seat; and thus the throttle body is directly exposed to the outside when the seat is lifted or removed. However, the fuel introducing portion in the throttle body is delicate with respect to a disturbance such as impact caused by opening/closing of the seat, and contamination. Use of an electronically controlled injector in the fuel introducing portion is particularly a matter of concern. Hence, in a saddle-ride type Vehicle, it is desirable to provide some arrangement to prevent the input of disturbances to the throttle body upon closing/opening of the seat.

SUMMARY OF THE INVENTION

A saddle-ride type vehicle which eliminates input disturbances to a throttle body upon opening/closing of a seat, and which is capable of protecting an injector with a high degree of reliability is described herein.

One embodiment of the invention is directed to a saddle-ride type vehicle (e.g., the saddle-ride type vehicle in the embodiment described later) in which an air cleaner (e.g., the air cleaner 18 in the embodiment described later) is disposed on the rear side of an engine (e.g., the engine 5 in the embodiment described later) attached to a body frame (e.g., the body frame 4 in the embodiment described later), a fuel tank (e.g., the fuel tank 22 in the embodiment described later) is disposed above the engine, and a seat (e.g., the seat 23 in the embodiment described later) on which a driver is seated, is attached on the rear side of the fuel tank such that the seat is openable and closable. The vehicle further comprises a throttle body (e.g., the throttle body 17 in the embodiment described later) which has an injector (e.g., the injector 17a in the embodiment described later) and is disposed in a space below the seat and between the engine and the air cleaner; and a protector cover (e.g., the protector cover 80 in the embodiment described later) which covers the upper side of the throttle body.

The upper side of the throttle body is covered with the protector cover; and thus the throttle body is not directly exposed to the outside while the seat is open, thereby preventing foreign matter such as dirt from adhering to the injector and members in the vicinity thereof. Further, since the throttle body is covered by the protector cover from the upper side, it is unnecessary to pay special attention when opening and closing the seat, thereby facilitating the opening and closing.

Further, the saddle-ride type vehicle may be constructed such that the protector cover is supported by the body frame and a snorkel (e.g., the snorkel 54 in the embodiment described later) on the upper stream side of the air cleaner.

When an external force is imposed on the protector cover so supported, the external force is received by the body frame and the air cleaner, and does not act on the throttle body.

The protector cover, according to one embodiment, is fixed to a vehicle body with a clip (e.g., the clips 90, 91 in the embodiment described later).

The protector cover is then reliably supported by the vehicle body to provide ease of assembly work and allow for improved maintenance capabilities.

The protector cover preferably covers the injector from the upper side to reliably protect the delicate injector that tends to be adversely affected by contamination and impacts.

One part of the protector cover forms an expanded portion (e.g., the expanded portion 85 in the embodiment described later) inside which a component protecting space (e.g., the component protecting space 93 in the embodiment described later) is defined.

The expanded portion of the protector cover can thus provide a component protecting space to accommodate and protect a component, thereby enabling reliable protection of the component, even within a limited space.

The protector cover preferably has an opening (e.g., the opening 86 in the embodiment described later) for avoiding interference with a vehicle body component (e.g., the resonator 71 in the embodiment described later).

The opening of the protector cover can advantageously prevent interference between the protector cover and the vehicle body component. Hence, the protector cover and the vehicle body component can be arranged close to each other in a limited amount of space.

Since the upper side of the throttle body is covered by the protector cover, foreign material is reliably prevented from adhering to the injector and surrounding members while the seat is open. Further, external forces are prevented from acting on the throttle body when the seat is closed or in other situations.

DETAILED DESCRIPTION OF THE PREFERRED EMBODIMENTS

Figure 1:
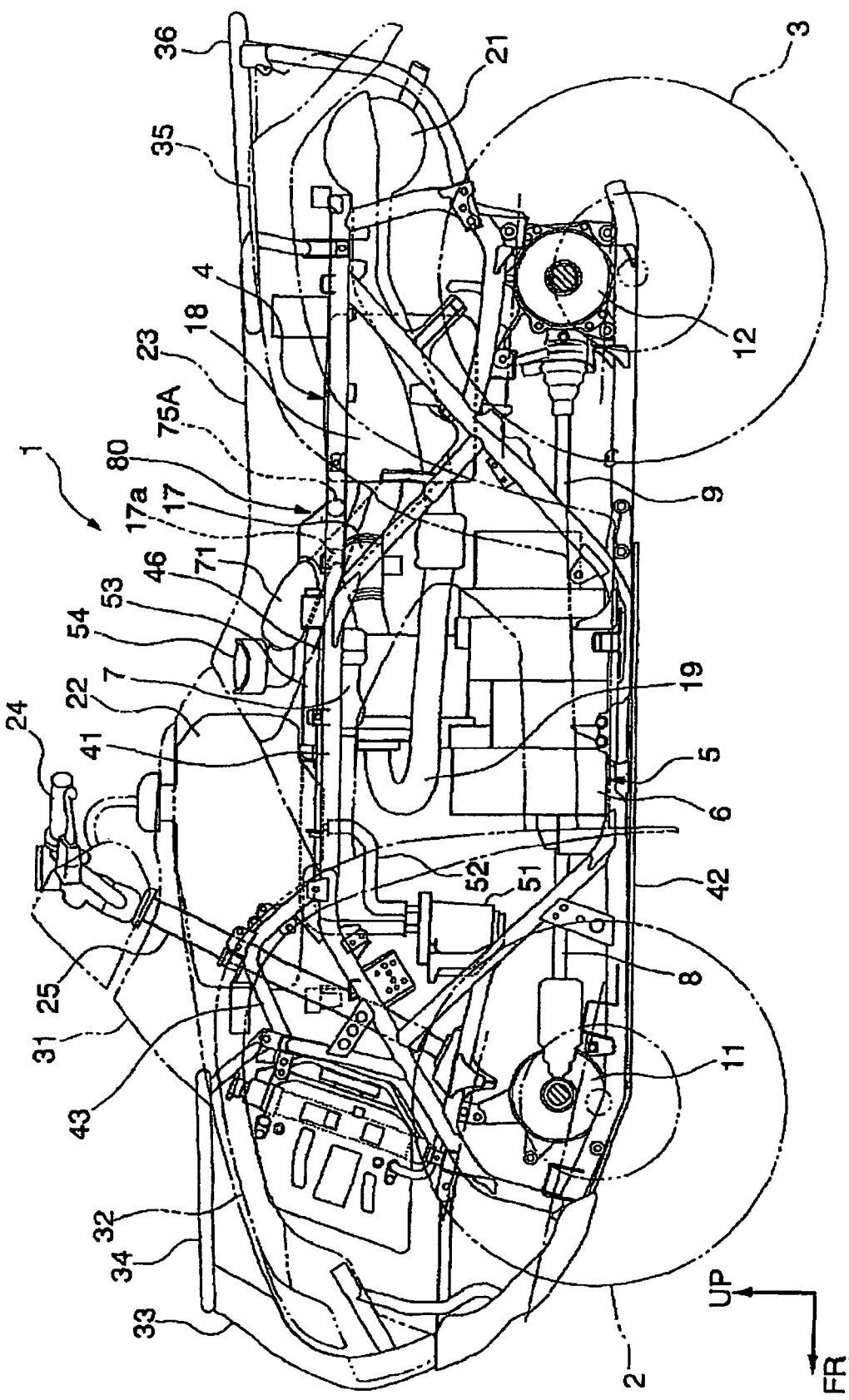
FIG. 1 is a side view of a saddle-ride type vehicle according to one embodiment of the invention, mainly showing a framework thereof.

A saddle-ride type vehicle 1, shown in FIG. 1, includes low-pressure balloon tires of large diameter mounted on front and rear wheels 2, 3, respectively. The vehicle 1 has a road clearance so large that the vehicle 1 exhibits an excellent running performance, even when operated mainly in uneven terrains. The saddle-ride type vehicle 1 is commonly referred to as an ATV.

An engine 5 is mounted in a substantially central portion of a body frame 4 in a longitudinal layout, such that the engine power is transmitted to each of propeller shafts 8, 9 for front and rear wheels via a transmission not shown. The propeller shafts 8, 9 transmit the power to the front and rear wheels 2, 3 via transfer mechanisms 11, 12, respectively. A crankcase 6 forms a lower portion of the engine 5 and also serves as a transmission case in which the transmission is accommodated.

Figure 2:
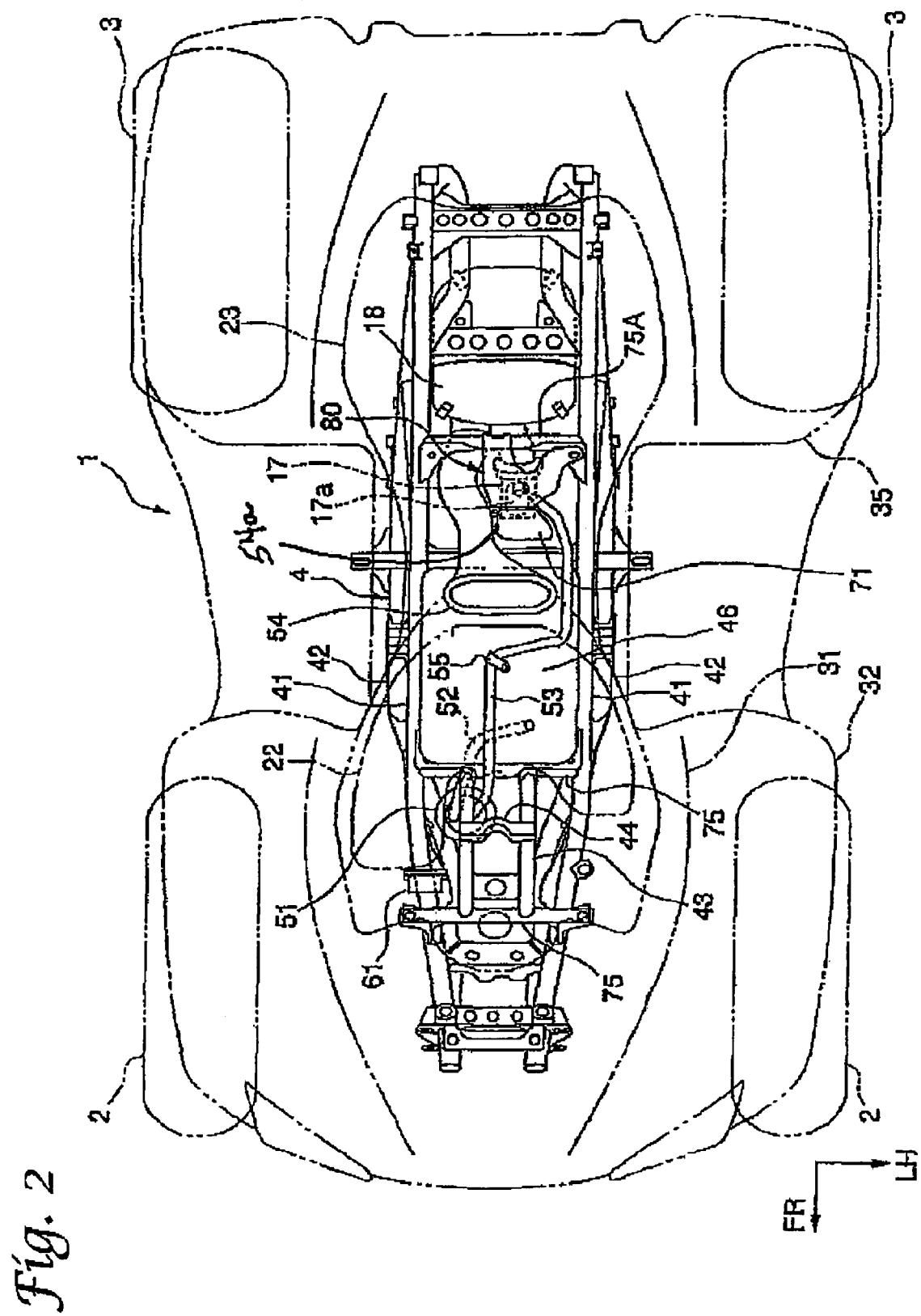
FIG. 2 is a plan view of the saddle-ride type vehicle according to the embodiment shown in FIG. 1.

The body frame 4 has a substantially box-like shape such that on each of the lateral sides of the vehicle, an upper pipe 41 and a lower pipe 42 each extending in a substantially longitudinal direction of the vehicle body are connected into a pipe assembly; and the left and right pipe assemblies are connected to each other with a plurality of cross pipes 75, 75A (shown in FIG. 2).

The engine 5 is mounted at the substantially central portion of the body frame 4 on the side of a bottom thereof; and a cylinder head 7 of the engine 5 is located at a slightly lower side of the upper pipes 41. An air cleaner 18 of an engine intake system is attached to a portion of the vehicle body on the rear side of the engine 5 mounted at the substantially central portion of the body frame 4. The air cleaner 18 is connected via a throttle body 17 to an air suction portion on the rear side of the cylinder head 7. A snorkel 54 extending obliquely upward and frontward is disposed in front of the air cleaner 18 and at a position off the throttle body 17 in the transverse direction of the vehicle. Outside air is introduced from an opening formed in a front end portion of the snorkel 54. An injector 17a as a fuel introducing portion is integrally assembled to the throttle body 17 so that a fuel supplied from a fuel pump 51, as described later, is ejected into an air intake passage under control by a controller (not shown). An exhaust pipe 19 is connected at an end portion thereof to a front portion of the cylinder head 7, and extends frontward and is then bent rearward to be connected to a silencer 21 at a rear side portion of the vehicle body.

A fuel tank 22 formulated of resin is disposed above the engine 5. On the rear side of the fuel tank 22, a saddle-ride type seat 23 is disposed to cover the upper sides of the throttle body 17, snorkel 54, air cleaner 18, and other elements. The seat 23 can be opened and closed. A handle post portion 43 is disposed in the body frame 4 on the front side of the engine 5; and a steering shaft 25 is supported by the handle post portion 43. Bar-like handlebars 24 are attached to an upper end portion of the steering shaft 25; and a front wheel steering mechanism not shown, is connected to a lower end portion of the steering shaft 25. A front portion of the fuel tank 22 is curved in a substantially U-shape to extend on the opposite sides of the steering shaft 25 in order to ensure a sufficient inner volume.

A fuel pump 51 is disposed below the fuel tank 22 and on the front side of the engine 5. The fuel pump 51 has a suction portion and a discharge port. A communication pipe 52 extending downward from the fuel tank 22 is connected to the suction portion. A fuel supply pipe 53 for supplying the discharged fuel to the injector 17a is connected to the discharge port.

A shield plate 46 is attached across the left and right upper pipes 41, 41 of the body frame 4 substantially immediately under a rear half of the fuel tank 22. The shield plate 46 serves as a partition separating the engine 5 from the fuel tank 22 and seat 23 above the engine 5, so as to block transfer of high heat from the engine 5 to the fuel tank 22 and seat 23. The fuel supply pipe 53, of which one end is connected to the fuel pump 51, extends upward from the side of a front end portion of the shield plate 46 and then along an upper surface of the shield plate 46. As shown in FIG. 2, the fuel supply pipe 53 is bent over the shield plate 46 in a crank-like shape as seen from an upper side, in order to bypass members such as the snorkel 54 extending from the air cleaner 18 toward an upper side of the shield plate 46. The fuel supply pipe 53 is fixed to the shield plate 46 at a predetermined position by means of a cramp 55 as a positioning and fixing portion in the vicinity of the fuel supply pipe 53 bent portion.

The snorkel 54 is connected to a substantially central portion of a rear end portion of the shield plate 46, by bolting or otherwise, to be supported thereby.

A resonator 71 (body constituting part) is bifurcated leftward from the snorkel 54 at a position in the snorkel 54 slightly on the rear side of the portion connected with the shield plate 46. The resonator 71 expands rearward from a connecting tube portion into substantially a shape of a frustum of a pyramid, as shown in FIGS. 3 and 4.

The members including the air cleaner 18 and the snorkel 54 that are located under the seat 23 are exposed to the outside of the vehicle (see FIGS. 3 and 4) along with the upper pipes 41 of the body frame 4 and others when the seat 23 is lifted. However, a protector cover 80 of resin is disposed over the throttle body 17 so that an upper side of the throttle body 17 is not directly exposed to the outside of the vehicle.

Figure 3:
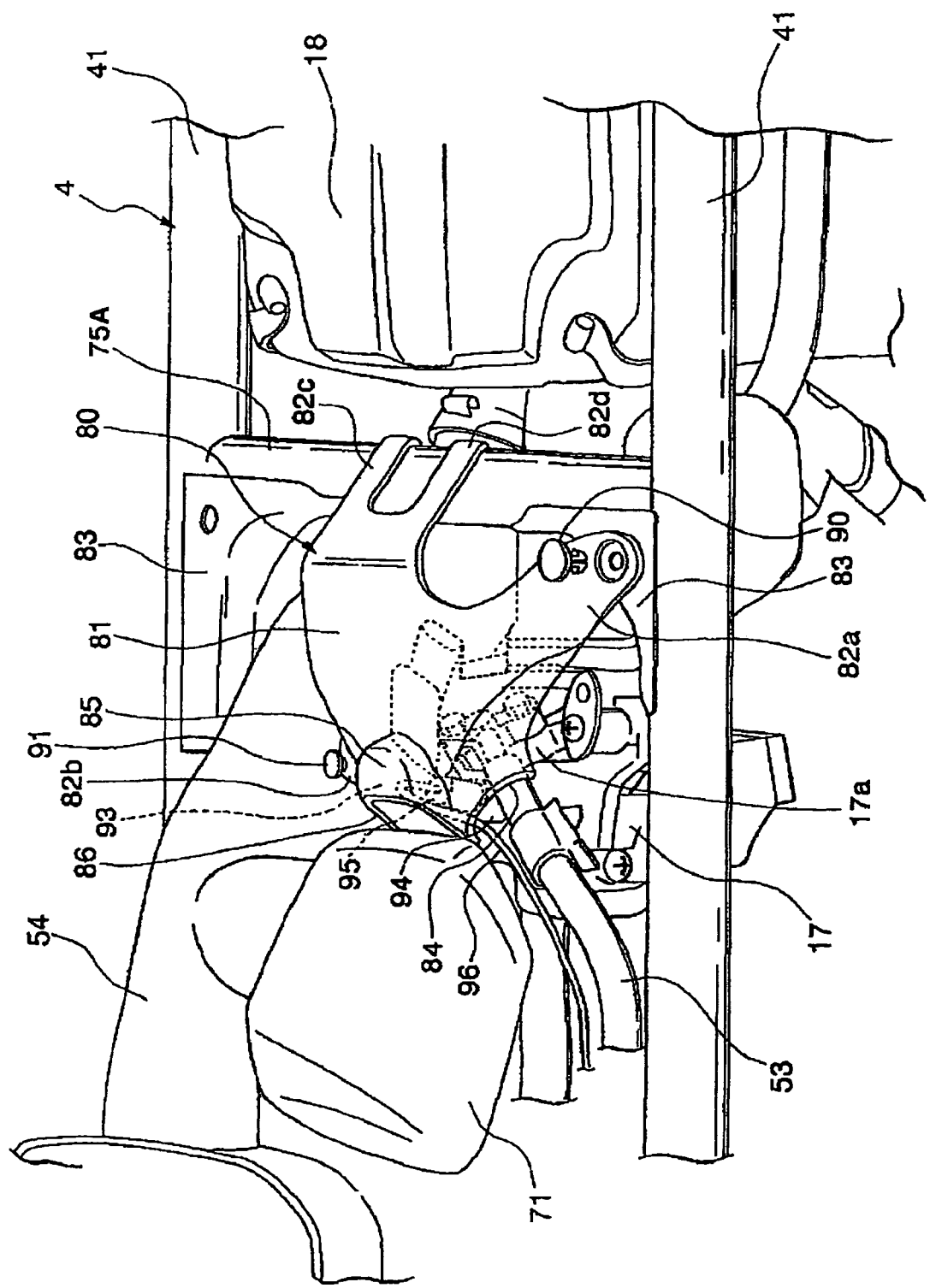
FIG. 3 is a perspective view of a principal portion of the embodiments shown in FIGS. 1 and 2.
Figure 4:
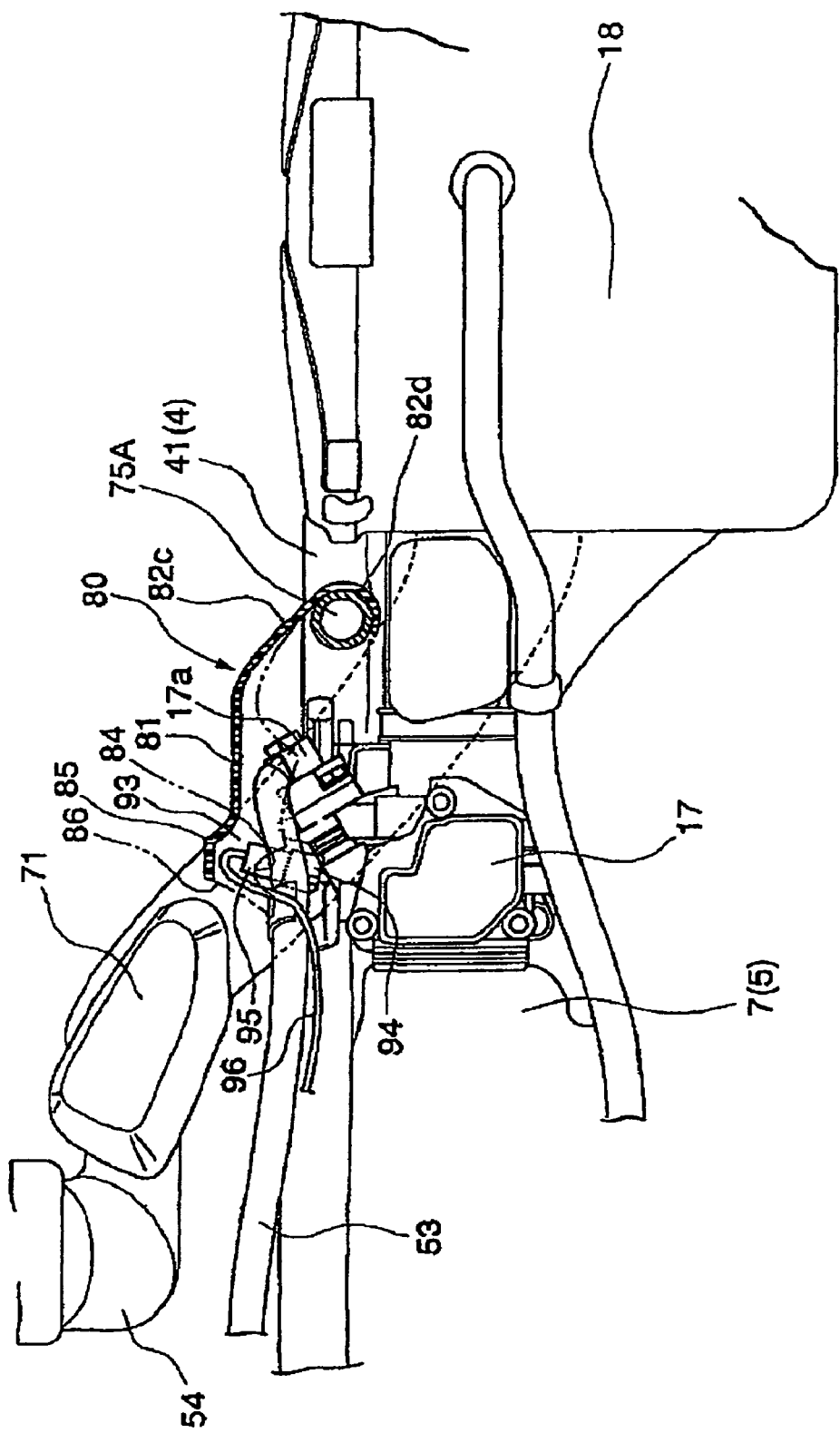
FIG. 4 is a partial sectional side view of the principal portion of the embodiment shown in FIG. 3.

As shown in FIGS. 3 and 4, the protector cover 80 has a cover main portion 81 that is convex upward and support arms 82a, 82b, 82c, each support arm extending from an outer periphery of the cover main portion 81. One of the support arms 82a is fixed with a clip 90, to a gusset plate 83 disposed across connecting portions at each of which the cross pipe 75A is connected to one of the upper pipes 41. Another support arm 82b at a position opposite to the support arm 82a is fixed, with a clip 91, to a flange (not shown) extending from the snorkel 54. The flange is schematically shown in FIG. 2 at numeral 54a. The remaining support arms 82c together form an auxiliary arm, and has at an end thereof a curled portion 82d that engages, or is wound around, a substantially central portion of the cross pipe 75A. Thus, the protector cover 80 is supported substantially at its cross pipe 75A by the snorkel 54 and the body frame 4

On the left-hand side of the cover main portion 81, a guide wall 84 that is arcuate in cross section is disposed to cover the fuel supply pipe 53 from the upper side. At a front-side portion of an upper wall of the cover main portion 81, there is formed an expanded portion 85 protruding upward. In a front end surface of the cover main portion 81 including the expanded portion 85, a substantially semicircular shaped opening 86 is formed. A rear end portion of the resonator 71 in the substantially pyramid frustum shape is disposed to face the opening 86 from the front side. Inside the expanded portion 85, there is defined a component protecting space 93, in which are disposed the injector 17a, a coupler 94, a connector 95, a wiring 96, and other elements that are connected to the injector 17a.

In FIGS. 1 and 2, reference numeral 31 denotes a body cover of resin covering a front portion of the vehicle body including the fuel tank; and reference numerals 32, 35 denote the front fender and a rear fender that respectively cover the front wheel and the rear wheels. In FIG. 1, reference numerals 33 and 34 respectively denote a front protector and a front carrier; and reference numeral 36 denotes a rear carrier.

The upper side of the throttle body 17 is covered by the protector cover 80 so as not to be directly exposed to the outside while the seat 23 is lifted. Foreign matter such as dirt, dust, and water droplets will therefore not tend to adhere to the injector 17*a* or other members in the vicinity thereof, even when the seat 23 is lifted.

Further, the protector cover 80 is supported and fixed to the body frame 4 and the snorkel 54 while covering the upper side of the throttle body 17. Hence, even when a load is imposed on the protector cover 80 from the upper side, the load does not act on the throttle body 17. Therefore, when the seat 23 or other members are pressed onto an upper surface of the throttle body 17 upon closing of the seat 23, direct contact between the pressed member and the throttle body 17 is prevented by the presence of the protector cover 80; and any indirect input force between the load and the throttle body 17 via the protector cover 80 does not occur.

Any disturbance such as, for example, adhesion of foreign matter and/or input of an external force therefore does not tend to adversely act on the injector 17*a* or have adverse effects in its immediate vicinity upon opening and closing of the seat 23, resulting in a stable and highly accurate control of fuel injection by the injector 17*a*.

More particularly, the expanded portion 85 is integrally formed in the protector cover 80 as a local upward expansion thereof; and components tending to be adversely affected by contamination and impact, such as the injector 17*a*, coupler 94, and connector 95, are accommodated in the component protecting space 93 defined inside the expanded portion 85. Protection of the components is thereby facilitated with a highly rigid structure without occupying a large space.

Further, the opening 86 is formed at a front end portion of the protector cover 80 and faces the rear end portion of the resonator 71 to arrange the protector cover 80 and the resonator 71 sufficiently close to each other without inviting interference therebetween. Hence, a covering area of the protector cover 80 can be increased to more reliably protect the throttle body 17. Although it is possible to arrange a recessed portion formed in the front end portion of the protector cover 80 to avoid interference with the resonator 71, the present arrangement where the opening 86 is employed is more advantageous in that interference with the resonator 71 is more effectively prevented, manufacturing is made easier, and the weight is decreased.

The embodiments are not limited to the details of the embodiments described above, but may be embodied with various design changes without departing from the principles presented herein above. For instance, although the resonator 71 is disposed on the front side of the protector cover 80, the opening may be formed at a position to face a vehicle body component so as to prevent interference with the vehicle body component where another vehicle body component is disposed in the vicinity of the protector cover 80.

What is claimed is:

1. A saddle-ride type vehicle, comprising:
   An air cleaner disposed on the rear side of an engine attached to a vehicle body frame;
   a fuel tank disposed above the engine;
   a driver seat attached on the rear side of the fuel tank such that the seat is openable and closable;
   a throttle body which has an injector and that is disposed in a space below the seat and between the engine and the air cleaner; and
   a protector cover which covers the upper side of the throttle body, said protector cover being configured also to cover the injector from the upper side, so that the injector is not directly exposed to the outside when the seat is lifted.

2. The saddle-ride type vehicle according to claim 1, wherein a part of the protector cover is expanded to form an expanded portion inside which a component protecting space is defined.

3. The saddle-ride type vehicle according to claim 2, wherein a coupler, a connector, and said injector are accommodated in said protecting space.

4. The saddle-ride type vehicle according to claim 1, wherein the protector cover has an opening for avoiding interference with a vehicle body component.

5. The saddle-ride type vehicle according to claim 4 including a resonator and a snorkel, said resonator being bifurcated from said snorkel with said opening in said protector cover facing said resonator.

6. The saddle-ride type vehicle according to claim 1 wherein said body frame includes a cross pipe and said protector cover includes support arms forming an auxiliary arm, said auxiliary arm having an end with a curled portion which engages a central portion of said cross pipe.

7. A saddle-ride type vehicle, comprising:
   An air cleaner disposed on the rear side of an engine attached to a vehicle body frame;
   a fuel tank disposed above the engine;
   a driver seat attached on the rear side of the fuel tank such that the seat is openable and closable;
   a throttle body which has an injector and that is disposed in a space below the seat and between the engine and the air cleaner; and
   a protector cover which covers the upper side of the throttle body, wherein the protector cover is supported by the body frame and a snorkel on an upper stream side of the air cleaner.

8. The saddle-ride type vehicle according to claim 7, wherein the protector cover is fixed to said snorkel with a clip.

9. The saddle-ride type vehicle according to claim 7 wherein said snorkel is located under the seat and exposed to outside of the vehicle along with upper pipes of the body frame.

* * * * *